(12) United States Patent
Peng et al.

(10) Patent No.: US 11,816,614 B2
(45) Date of Patent: Nov. 14, 2023

(54) PROBABILISTIC FRESH IN-STORE PRODUCTION MANAGEMENT

(71) Applicant: Walmart Apollo, LLC, Bentonville, AR (US)

(72) Inventors: Zhejian Peng, Bentonville, AR (US); Michael A. Juang, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 165 days.

(21) Appl. No.: 17/219,205

(22) Filed: Mar. 31, 2021

(65) Prior Publication Data

US 2022/0318709 A1 Oct. 6, 2022

(51) Int. Cl.
*G06Q 10/06* (2023.01)
*G06Q 10/0631* (2023.01)
*G06Q 30/0202* (2023.01)
*G06N 20/00* (2019.01)
*G06Q 10/04* (2023.01)
(Continued)

(52) U.S. Cl.
CPC ......... *G06Q 10/06315* (2013.01); *G06N 7/01* (2023.01); *G06N 20/00* (2019.01); *G06Q 10/04* (2013.01); *G06Q 30/0202* (2013.01); *G06Q 10/087* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 7,774,225 B2 * | 8/2010 | Cargille ........... | G06Q 10/06375 705/7.31 |
| 8,065,203 B1 * | 11/2011 | Chien ................ | G06Q 30/0202 705/28 |
| 8,175,917 B2 | 5/2012 | Flynn | |

(Continued)

OTHER PUBLICATIONS

SAP; "SAP Forecasting and Replenishment, add-on for fresh products Administrator Guide", Published May 10, 2019, https://help.sap.com/doc/4ba72bf376d9485e953ee99696227ab2/1.0.3/en-US/loio54d7bab1a5fc41118b3a2adc7dbd512d.pdf, 88 pages.

(Continued)

*Primary Examiner* — Arif Ullah
(74) *Attorney, Agent, or Firm* — Barta, Jones & Foley, PLLC

(57) ABSTRACT

Systems, apparatuses, and methods are provided herein for in-store production management. A method comprises training a probabilistic demand model using the training dataset based on a machine learning algorithm, determining a probabilistic forecast of a demand for a perishable product at a store location on a date based on the probabilistic demand model, applying an objective function to each of the plurality of demand values in the probabilistic forecast to determine an objective value for each of the plurality of demand values, determining a target supply value based on a select demand value with a highest objective value, determining a production plan based on the target supply value and a carryover value retrieved from the store data database, and providing a production management user interface that comprises a display of an identifier of the perishable product and the production plan associated the perishable product.

20 Claims, 4 Drawing Sheets

(51) Int. Cl.
  *G06N 7/01*     (2023.01)
  *G06Q 10/087*   (2023.01)

(56) References Cited

U.S. PATENT DOCUMENTS

| | | | | |
|---|---|---|---|---|
| 10,949,894 B1* | 3/2021 | Bansal | ............... | G06Q 30/0206 |
| 11,361,394 B1* | 6/2022 | Sepe | ............... | G06Q 10/06315 |
| 2004/0260513 A1 | 12/2004 | Fitzpatrick | | |
| 2008/0294500 A1 | 11/2008 | Koether | | |
| 2009/0018871 A1* | 1/2009 | Essig | ............... | G06Q 30/0236 |
| | | | | 705/26.1 |
| 2013/0275236 A1* | 10/2013 | Koke | ............... | G06Q 30/0212 |
| | | | | 705/15 |
| 2022/0108335 A1* | 4/2022 | Kaveetil | ............... | G06N 3/08 |

OTHER PUBLICATIONS

Vermorel, Joannes; "Probabilistic Forecasting (Supply Chain)", Published Nov. 2020, https://www.lokad.com/probabilistic-forecasting-definition; 23 pages.

* cited by examiner

| Supply / Demand | 20 | 30 | 40 | 50 | 60 |
|---|---|---|---|---|---|
| 20 (10%) | Ov1=obj(20,20) | Ov1=obj(30,20) | Ov1=obj(40,20) | Ov1=obj(50,20) | Ov1=obj(60,20) |
| 30 (15%) | Ov2=obj(20,30) | Ov2=obj(30,30) | Ov2=obj(40,30) | Ov2=obj(50,30) | Ov2=obj(60,30) |
| 40 (30%) | Ov3=obj(20,40) | Ov3=obj(30,40) | Ov3=obj(40,40) | Ov3=obj(50,40) | Ov3=obj(60,40) |
| 50 (15%) | Ov4=obj(20,50) | Ov4=obj(30,50) | Ov4=obj(40,50) | Ov4=obj(50,50) | Ov4=obj(60,50) |
| 60 (10%) | Ov5=obj(20,60) | Ov5=obj(30,60) | Ov5=obj(40,60) | Ov5=obj(50,60) | Ov5=obj(60,60) |
| Combined Ovective value | Ov=(Ov1*.1)+(Ov2*.15)+(Ov3*.3)+(Ov4*.15)+(Ov5*.1) | Ov=(Ov1*.1)+(Ov2*.15)+(Ov3*.3)+(Ov4*.15)+(Ov5*.1) | Ov=(Ov1*.1)+(Ov2*.15)+(Ov3*.3)+(Ov4*.15)+(Ov5*.1) | Ov=(Ov1*.1)+(Ov2*.15)+(Ov3*.3)+(Ov4*.15)+(Ov5*.1) | Ov=(Ov1*.1)+(Ov2*.15)+(Ov3*.3)+(Ov4*.15)+(Ov5*.1) |

*FIG. 4*

PROBABILISTIC FRESH IN-STORE PRODUCTION MANAGEMENT

TECHNICAL FIELD

This invention relates generally to retail store production management systems.

BACKGROUND

Retails stores such as grocery stores often have onsite production of some products for sale. For example, a bakery department of a grocery store may bake bread onsite, and a meats department may thaw and cut meat onsite. These types of products generally have a short shelf life once produced and are sold at the same store location.

BRIEF DESCRIPTION OF THE DRAWINGS

Disclosed herein are embodiments of apparatuses and methods for providing in-store production management. This description includes drawings, wherein:

FIG. 4 comprises an example objective value calculation in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for providing in-store production management. In some embodiments, a system for in-store production management comprises a communication device configured to communicate with a plurality of in-store devices over a network, a store data database, and a control circuit coupled to the communication device and the store data database. The control circuit being configured to select a training dataset from the store data database, train a probabilistic demand model using the training dataset based on a machine learning algorithm, determine a probabilistic forecast of a demand for a perishable product at a store location on a date based on the probabilistic demand model, wherein the probabilistic forecast comprises a plurality of demand values each associated with a probability, and apply an objective function to each of the plurality of demand values in the probabilistic forecast to determine an objective value for with each of the plurality of demand values, determine a target supply value based on a select demand value with a highest objective value among the plurality of demand values, determine a production plan based on the target supply value and a carryover value retrieved from the store data database, and provide, via the communication device, a production management user interface to a user device associated with the store location, the production management user interface comprises a display of an identifier of the perishable product and the production plan associated the perishable product.

Figure 1:
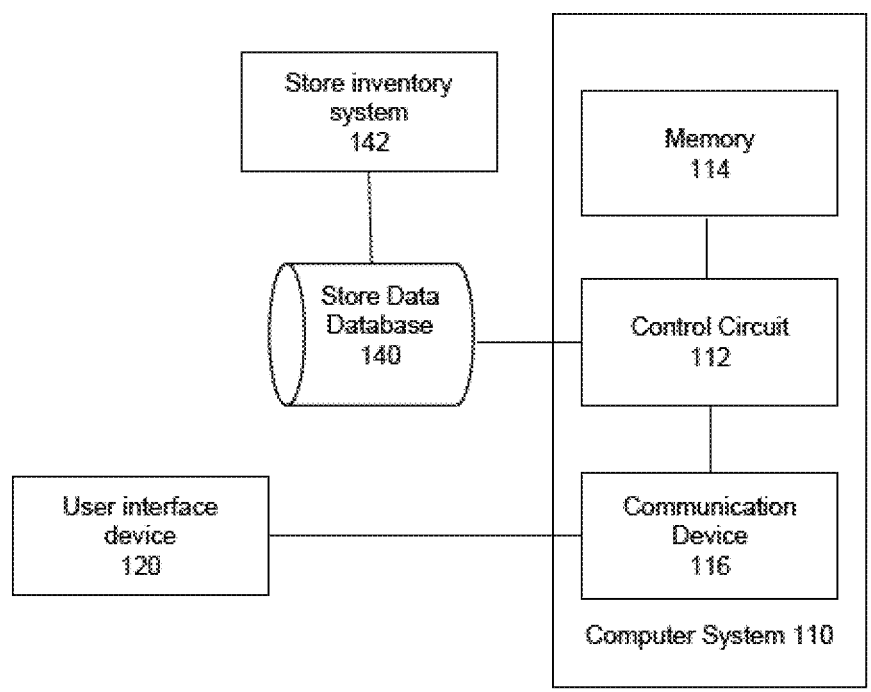
FIG. 1 comprises a block diagram of a system in accordance with some embodiments.

Referring now to FIG. 1, a system for in-store production management is shown. Generally, the system is provided for the management of in-store production of perishable products such as bakery items, prepared foods, meats, seafood, that are offered for sale at the same location. The computer system 110 is coupled to a store data database 140, and a user interface device 120.

The computer system 110 comprises a control circuit 112, a memory 114, and a communication device 116. The computer system 110 may comprise one or more of a server, a central computing system, a desktop computer system, a personal computer, a portable device, and the like. In some embodiments, the computer system 110 may comprise a computer cluster of one or more processor-based devices. The control circuit 112 may comprise a processor, a microprocessor, a central processing unit (CPU), a graphics processing unit (GPU), an application-specific integrated circuit (ASIC), and the like and may be configured to execute computer-readable instructions stored on a computer-readable storage memory 114. The computer-readable storage memory 114 may comprise volatile and/or non-volatile memory and have stored upon it, a set of computer-readable instructions which, when executed by the control circuit 112, causes the computer system 110 to provide production plans for in-store production of perishable products based on a probabilistic demand model and information stored in the store data database. For example, the system may provide production plans for bakeries and meat departments of a grocery store indicating how many loaves of French bread or how many pounds of marinated chicken should be produced at the store. In some embodiments, the computer-executable instructions may cause the control circuit 112 of the computer system 110 to perform one or more steps described with reference to FIGS. 2-3 herein. In some embodiments, the computer-executable instructions may cause the control circuit 112 of the computer system 110 to provide a production management user interface for viewing and interacting with the generated production plan. In some embodiments, the control circuit 112 may further receive feedback and supplemental information via the production management user interface to update the probabilistic demand model. In some embodiments, the computer system 110 may be remotely located from the store associated with the store inventory system 142, the store data database 140, and the user interface device 120. In some embodiments, the computer system 110 may provide production plans to a plurality of different store locations.

The communication device 116 may comprise a data port, a wired or wireless network adapter, and the like. In some embodiments, the computer system 110 may communicate with the user interface device 120 over a network such as a local network or the Internet. The user interface device 120 comprises user input/output devices such as a keyboard, a mouse, a touch screen, a display screen, a VR/AR display device, a speaker, a microphone, etc. In some embodiments, the user interface device 120 may be a standalone processor-based user device such as a personal computer, a desktop computer, a laptop computer, a mobile device, a smartphone, and the like. The user interface device 120 may execute an application for displaying a production management user interface based on data provided by the computer system 110. While only one user interface device 120 is shown, the computer system 110 may simultaneously support production management user interfaces running on a plurality of user interface devices associated with one or more store locations. In some embodiments, one or more components of FIG. 1 may communicate over a network such as a local network, a private network, or the Internet.

The store data database 140 comprises computer-readable memory storage storing data associated with one or more retail stores. In some embodiments, the store data database 140 generally stores and tracks historical data used to train the probabilistic demand model, forecast variables used to forecast demand for a product at a store location, objective function variable used by objective functions to calculate objective values, and store inventory information. In some embodiments, the store data database 140 may store data on past sales, past production, past throws, item attributes, item pricing, item production costs, raw ingredient costs, labor costs, store attributes, promotions, weather, holiday, store demographic, etc. In some embodiments, the store data database comprises user-entered feedback data or supplemental data received via the production management user interface from the plurality of in-store devices. In some embodiments, the store data database 140 is also updated by the store inventory system 142 to record data such as actual in-store sales, inventory level, pricing changes, etc. In some embodiments, the store data database 140 may store data for a single store location or a plurality of store locations. In some embodiments, the store data database 140 may comprise data that are specific to one or more store locations (e.g. past sales, demographic, etc.) and data that is shared by a plurality of store location (e.g. item attribute, item ingredient cost, etc.)

Figure 2:
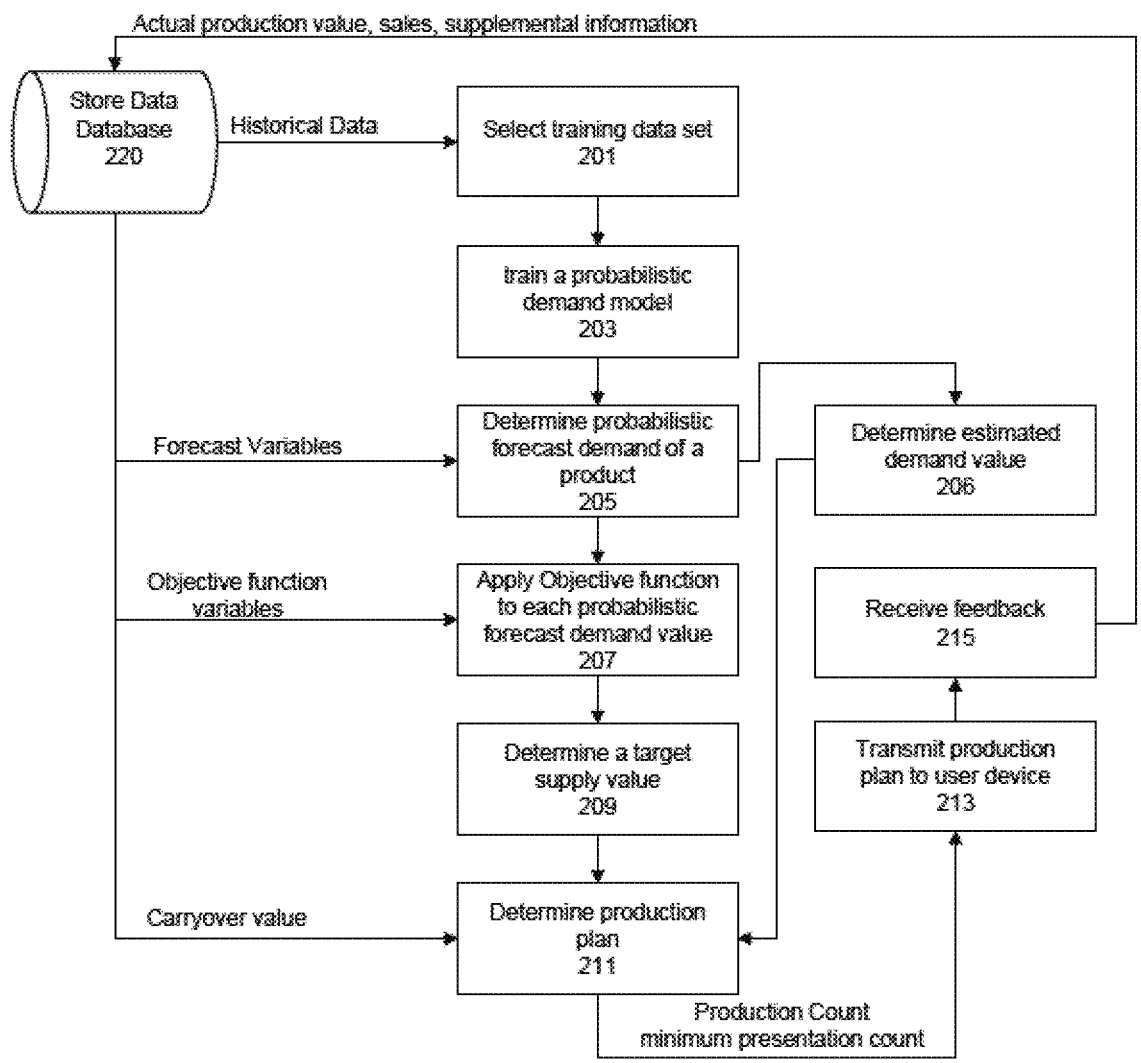
FIG. 2 comprises a flow diagram in accordance with some embodiments.

Referring now to FIG. 2, a method for providing in-store production management is shown. In some embodiments, the steps shown in FIG. 2 may be performed by a processor-based device such as a control circuit executing a set of computer-readable instructions stored on a computer-readable memory. In some embodiments, one or more steps of FIG. 2 may be performed by the computer system 110 described with reference to FIG. 1 herein or a similar device.

In step 201, the system selects a training data set from the store data database 220. In some embodiments, the training dataset is derived from a larger data set based on data anomaly removal and automated time series diagnostics. In some embodiments, the training data set may comprise historical information associated with multiple different products. In some embodiments, the training data may comprise actual sales volumes of one or more products during different time periods (e.g. dates, weeks) and variables associated with the product (e.g. volume produced, substitutable products for sale, presentation location, pricing), the store location (e.g. weather, promotion, nearby event), and the time period (e.g. day of the week, holiday) during that time period. In some embodiments, the training data may further include user-entered feedback data or supplemental data received via the production management user interface. In some embodiments, the training data may further comprise long-term/static information such as product attributes and store customer demographics. In some embodiments, the training data set may comprise data associated with a single store or a plurality of stores.

In step 203, the system trains a probabilistic demand model using the training dataset based on a machine learning algorithm. In some embodiments, the probabilistic demand model takes in variables that can affect demand (e.g. product attributes, store attributes, time period attributes) to categorize a plurality of possible demand values with a probability value. In some embodiments, the probabilistic demand model is trained based on a supervised machine learning algorithm for forecasting multiple time series using an autoregressive recurrent neural network (RNN) algorithm. In some embodiments, the probabilistic demand model may be trained based on a DeepAR algorithm described in Salinas, David, et al. "DeepAR: Probabilistic forecasting with autoregressive recurrent networks." International Journal of Forecasting 36.3 (2020): 1181-1191 the entirety of which is incorporated herein. In some embodiments, the probabilistic demand model is further determined based on selecting samples from the probabilistic demand model and calibrating the probabilistic demand model by scaling samples based on additional machine learning models. Generally, the probabilistic demand model may be determined by one or more machine learning algorithms capable of providing probabilistic model output.

In step 205, the system determines a probabilistic forecast of a demand for a perishable product at a store location on a date based on the probabilistic demand model. In some embodiments, the forecast is performed based on forecast variables retrieved from the store data database 220, determined by the system, and/or entered via a user interface. For example, a store employee may use the production management user interface to enter local events such as road closure, wildfire, etc. into the system to be used as forecast variables. Examples of forecast variables may comprise the day of the week, holiday, event, weather, pricing, etc. In some embodiments, the probabilistic model may be trained on data associated with multiple products and/or store location, but the forecast variables generally include data specific to a product and a store location being forecasts. In some embodiments, the probabilistic forecast generally comprises a plurality of demand values each associated with a probability. In the example shown in FIG. 4, the model predicts that the probability of the demand being 20, 30, 40, 50, and 60 are 10%, 15%, 30%, 15%, and 10% respectively. In some embodiments, the granularity of the estimated demands (e.g. per count, per 10 counts, per dozen, etc.) may vary based on the configuration of the system.

In step 207, the system applies an objective function to each of the plurality of demand values in the probabilistic forecast to determine an objective value for each of the plurality of demand values. In some embodiments, the objective value for a demand value is determined based on using the demand value as a supply value and calculating costs of overproduction or underproduction at the plurality of demand values of the probabilistic forecast. In some embodiments, the objective value of each supply value is determined based on the following equation:

$$Ov_Y = \sum_{x=0}^{\infty} obj(X, Y) \times f(X)$$

Where the objective value ($Ov_y$) of a number of units of supply (Y) is the sum of the objective function at a number of probable demand values (X) based on the model weighted by the probability of that probable demand value f(X). In the example shown in FIG. 4, the objective value of the supply of 20 may be determined as follows:

$$Ov_{20}=obj(20,20)\times10\%+obj(20,30)\times15\%+obj(20,40)\times30\%+obj(20,50)\times15\%+object(20,60)\times10\%$$

In some embodiments, as in the example in FIG. 4, the system may group demand values (e.g. 26-35 counts grouped at 30) and their respective probability to simplify the calculation. In some embodiments, as in the example in FIG. 4, the system may only include estimated demands or demand groups with probabilities above a threshold probability (e.g. 1%, 2%) in the calculation.

The objective function generally refers to a function that applies a numerical value to the outcome of one or more supply and demand pairings. In some embodiments, the objective function may reflect the cost of overproduction (e.g. wasted raw material cost, labor cost, storage space, reduce freshness, etc.), the cost of underproduction (e.g. lost sales, lost sales of complementary items, customer dissatisfaction, etc.), and factors that remediate such costs (e.g. available substitute product). As used here, costs may include monetary and nonmonetary values (e.g. customer loyalty) to the business. The objective function may be determined based on objective function variables such as raw material costs, labor cost, profit per unit, product shelf life, etc. retrieved from the store data database 220. Generally, the objective function may be an equation that combines multiple business values at respective weights to generate a score/value for the outcome of a given supply and demand combination.

In step 209, the system determines a target supply value based on a select demand value with the highest objective value among the plurality of demand values. The target supply value generally corresponds to the total number/volume of product available for sale for the forecasted date that will maximize the objective value based on the probabilities demand model and the objective function. In some embodiments, the target supply value may be rounded up or down to the nearest whole number or number group (e.g. pair, dozen).

In step 206, the system determines an estimated demand value based on the probabilistic forecast demand of a product. In some embodiments, the estimated demand value may be the mean or mode estimated demand value in the forecast. In some embodiments, the most probable demand value be the estimated demand value associated with the highest probability. In the example in FIG. 5, the estimated demand value may be 40.

In step 211, the system determines a production plan for the product at the store location. In some embodiments, the production plan includes a production value (P) representing the amount of the product that is recommended to be produced. The product value may be calculated based on subtracting the carryover value (C) from the target supply value (T) (P=T−C). That is if the store has carryover products (e.g. unsold and not expired) from a prior day, fewer products will need to be produced to get to the target supply value. In some embodiments, the carryover value may be determined based on the actual sales from the store inventory system or may be determined based on images captured by an optical sensor (e.g. store monitoring system or mobile device camera). In some embodiments, the production plan further comprises a minimum presentation (MP) value determined based on a difference between the target supply value (T) and an expected demand (E) from the probabilistic demand model (i.e., MP=Y−E).

In step 213, the system provides a production management user interface to a user device associated with the store location. In some embodiments, the user device may comprise a store-owned device or an employee device. In some embodiments, the production management user interface comprises a display of an identifier of the perishable product and the production plan associated with the perishable product. For example, the user interface may display "French bread, production: 30, minimum presentation: 10." In some embodiments, the production management user interface further comprises a manual adjustment option that allows a user to input an actual production value. For example, the store worker may know of an event (e.g. high school football game, road closure) that is not recorded in the system and change the production value based on their knowledge of the possible change in demand. In some embodiments, the system may set a minimum production value as the lower bound of the manual adjustment. The user interface may further facilitate other types of feedback such as a rating of the production plan.

In step 215, the system receives and stores feedback data. In some embodiments, the change in production value and other user input may be entered and added to the store data database as feedback to further train the probabilistic demand model for future forecasts. In some embodiments, the system may further retrieve information from the store inventory system, such as actual in-store sales, to add to the store data database 220 to further train the model.

While the modeling and forecast are generally described as being for a particular day herein, in some embodiments, the system may forecast with coarser or finer granularity such as every 2 days, AM and PM, every 4 hours, 2 hours, etc. The production plan may specify the production value for each forecasted period. In some embodiments, the actual sales and supplemental information (e.g. weather changes, road condition changes) from the same day may be used to forecast demand later in the day. For example, the system may provide a production plan in the morning, run a mid-day forecast based on the actual sales so far and any additional supplemental information from the morning, determine whether further production should be stopped or additional product should be produced, and output an updated production plan for the rest of the day.

Figure 3:
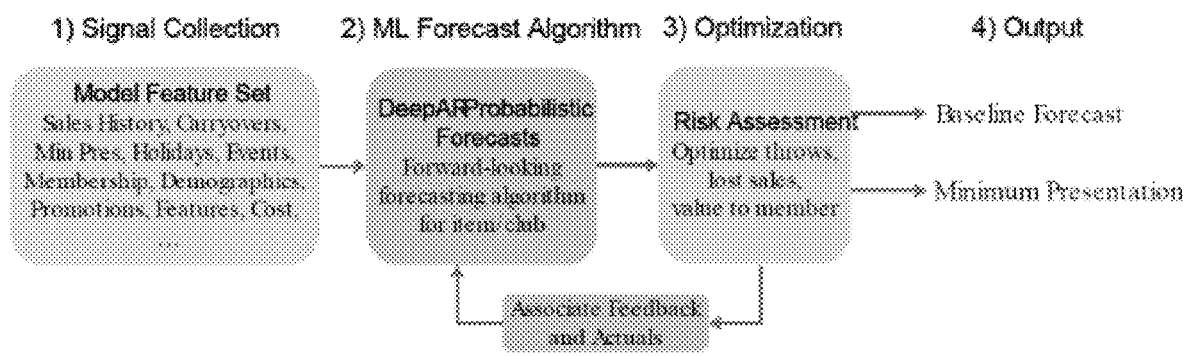
FIG. 3 comprises a flow diagram in accordance with some embodiments.

Referring now to FIG. 3, a process for determining a production plan for a product is provided. In some embodiments, the steps shown in FIG. 3 may be performed by a processor-based device such as a control circuit executing a set of computer-readable instructions stored on a computer-readable memory. In some embodiments, one or more steps of FIG. 3 may be performed by the control circuit 112 of the computer system 110 described with reference to FIG. 1 herein or a similar device.

In FIG. 4, the process starts at a signal collection stage. In some embodiments, the collected data that forms the model feature set may comprise sales history, carryovers, minimum presentations, holidays, events, membership, demographics, promotions, features, costs, etc. In the machine learning forecast algorithm stage, a probabilistic forecasts model such as DeepAR is used to provide forward-looking forecasting for an item at a store location. In the optimization stage, the system performs risk assessments based on optimized throws, lost sales, and value to customers. The optimization stage may be based on the objection function described herein. In some embodiments, feedback from workers and actual sales and throws are provided back to the ML algorithm to further train the model. The system then outputs a baseline forecast and a minimum presentation value which are used to generate a production plan for the store location.

In some embodiments, the systems and method described herein may be used to determine the amount of daily fresh food items (fresh meat, bakery items, pre-made meals) workers should prepare in a store. The inputs of the system may include product sales history, shelf life, product cost data, product throw data, product substitution availability, holidays, events, and day of the week. In some embodiments, the system considers the importance of the product to the club members and considers "lost sales". Production plans may be generated daily in a batch job at a central system for each store location and published for use at the stores. In some embodiments, the system optimizes the number of fresh items made daily using an objective function or loss function. In some embodiments, the system also assesses the risk of throwing away too much of an item or running out of an item.

In some embodiments, the system analyzes product sales to determine the importance of each product to members. In some embodiments, image recognition may be used for counting products leftover from the previous day(s). In some embodiments, the leftover value could be used as an input to calculate the next day's demand. In some embodiments, the system may be configured to perform a mid-day batch run based upon sales so far that day and update the production plan.

In stores, workers in the fresh products department typically make daily production plans for products that are produced on-site such as bakery items, fresh meat, and prepared food. In some embodiments, the production generally is made to balance the goals of increasing sales, increasing average freshness, maintaining in-stock rates, and reducing throws. Some production planning systems use a statistical and extrapolative model such as ARIMAX with safety stock adjustment. Each time series (item/store combination) has a model that is retained daily. Minimum presentation is computed only once a month in a separate process. In such a system, event-based ramp-up or ramp-down demand of items (e.g. apple pie for Independent Day, grilling meat for memorial day) is often missed in the demand forecast. The forecast also tends to skew high, leading to waste. Such systems also do not effectively make predictions for new items. As such, even with a forecast system in place, there is still significant reliance on manual tweaks and forecasts for minimum presentation. The frequency of over- and underestimations also decreases workers' trust in the system. In some tests, the probabilistic forecast system described herein has a reduction of error from 53% to 34% as compared to statistical and extrapolative models.

In some embodiments, the system consumes inputs from a consumer data platform (CDP), retrieves app-specific inputs from the dashboard, runs automated time series diagnostics, cleanses data for anomalies (e.g. temporary stock-outs, club ops issues), and run data quality check with alerting and breakpoints. In some embodiments, the system trains a model using autoregressive RNN structure (DeepAR) and tracks hyperparameters and model artifacts using MLflow to enhance reproducibility. In some embodiments, the system generates probabilistic forecasts by drawing samples from the trained model to simulate the spread of possible demand and enhance calibration by scaling samples with info from other ML models and observed accuracy. In some embodiments, the system optimizes production with a customized objective or loss function which takes into account the risk of throws and stock-outs and generates a minimum presentation value and guardrails on allowable associate adjustments. In some embodiments, the system may further use rules and constraints from experienced operators to determine the final output.

In some embodiments, the system further runs automated data quality checks with alerting and breakpoints on output and combines forecasts with supplemental info to display in a graphical user interface (e.g. via Azure SQL). In some embodiments, the system performs error diagnosis and track performances across different intersections (items, stores), and exports the results to a decision sciences team.

In some embodiments, the system may further integrate additional data to improve model performance and generate new insights. For example, the model may include historical weather and forecasts, production from labels, planogram data, item attributes, special orders, membership, and other club impact drivers.

In some embodiments, the probabilistic forecasting model determines the likelihood of all possible demand for a given item (in a location on a given day): e.g. 2% chance of 0 units demand, 4% for 1 unit, 5% for 2 units, etc. The mean of the distribution (the expected demand aka average value, close to what's most likely to happen) may be, for example, 10 units, referred to as the expected demand E, while the actual demand could be 22 or even 2.

In some embodiments, the forecast model may be based on the DeepAR algorithm. In some embodiments, the output of the DeepAR algorithm is scaled using the point estimates from other machine learning models. In some embodiments, the forecast model is trained based on a variety of deep learning and machine learning models.

In some embodiments, the objective function, which is a quantitative formalization of the relative goodness of different business outcomes, is a function obj(X,Y) which assigns a numerical value for each combination of X and Y where X is the number of units members want to purchase that day and Y is the number available for sale. Y is equal to the number of carryover units C plus the number produced that day, P. e.g. obj(X=0,Y=0)=1, obj(X=1,Y=0)=0.8. obj(X=2,Y=0)=0.6. obj(X=0, Y=1)=0.9. etc. The exact mapping (i.e. obj(1,0)=0.8 and obj(0,1)=0.9) may depend on the characteristics of the individual item and location such as the cost, the profit of a sale, the importance of the item to shoppers, the shelf life, the degradation of quality over time, etc.

In some embodiments, the recommended value to produce is the value P that maximizes the objective function value of obj(X,Y). In the example above, the forecasting model indicates that the probability that X=0 is 2%, probability that X=1 is 4%, etc. The sum is then calculated based on obj(X=0, Y=0)*Probability(X=0)+obj(X=1, Y=0)*Probability(X=1)+ .... The same calculation is repeated for Y=1, Y=2, Y=3, ... to find the value of Y that gives the largest sum. Generally, the target supply value is the value that is most likely to give the best outcome based on the objective function. If the carryover C is 5 units and Y=18 is the value that is best for maximizing f given the probabilities of different values of X happening, the production number P would be 13 (P=Y−C). The minimum presentation is defined as Y−E, or 18−10=8 units in the above example.

In one embodiment, a system for in-store production management comprises a communication device configured to communicate with a plurality of in-store devices over a network, a store data database, and a control circuit coupled to the communication device and the store data database. The control circuit being configured to select a training dataset from the store data database, train a probabilistic demand model using the training dataset based on a machine learning algorithm, determine a probabilistic forecast of a demand for a perishable product at a store location on a date based on the probabilistic demand model, wherein the probabilistic forecast comprises a plurality of demand values each associated with a probability, and apply an objective function to each of the plurality of demand values in the probabilistic forecast to determine an objective value for with each of the plurality of demand values, determine a target supply value based on a select demand value with a highest objective value among the plurality of demand values, determine a production plan based on the target supply value and a carryover value retrieved from the store data database, and provide, via the communication device, a production management user interface to a user device associated with the store location, the production management user interface comprises a display of an identifier of the perishable product and the production plan associated the perishable product.

In one embodiment, a method for in-store production management comprises selecting, with a control circuit, a training dataset from a store data database, training a probabilistic demand model using the training dataset based on a machine learning algorithm, determining, with the control circuit, a probabilistic forecast of a demand for a perishable product at a store location on a date based on the probabilistic demand model, wherein the probabilistic forecast comprises a plurality of demand values each associated with a probability value, and applying, with the control circuit, an objective function to each of the plurality of demand values in the probabilistic forecast to determine an objective value for each of the plurality of demand values, determining, with the control circuit, a target supply value based on a select demand value with a highest objective value among the plurality of demand values, determining a production plan based on the target supply value and a carryover value retrieved from the store data database, and providing, via a communication device configured to communicate with a plurality of in-store devices, a production management user interface to a user device associated with the store location, the production management user interface comprises a display of an identifier of the perishable product and the production plan associated the perishable product.

In some embodiments, an apparatus for in-store production management comprises a non-transitory storage medium storing a set of computer readable instructions and a control circuit configured to execute the set of computer readable instructions which cause to the control circuit to select a training dataset from a store data database, train a probabilistic demand model using the training dataset based on a machine learning algorithm, determine a probabilistic forecast of a demand for a perishable product at a store location on a date based on the probabilistic demand model, wherein the probabilistic forecast comprises a plurality of demand values each associated with a probability value, and apply an objective function to each of the plurality of demand values in the probabilistic forecast to determine estimated objective values for each of the plurality of demand values, determine a target supply value based on a select demand value with a highest objective value among the plurality of demand values, determine a production plan based on the target supply value and a carryover value retrieved from the store data database, and provide, via a communication device configured to communicate with a plurality of user devices, a production management user interface to a user device associated with the store location, the production management user interface comprises a display of an identifier of the perishable product and the production plan associated the perishable product.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for in-store production management comprising:
    a communication device configured to communicate with a plurality of in-store devices over a network;
    a store data database; and
    a control circuit coupled to the communication device and the store data database, the control circuit being configured to:
        select a training dataset from the store data database;
        train a probabilistic demand model using the training dataset based on a machine learning algorithm;
        determine a probabilistic forecast of a demand for a perishable product at a store location on a date based on the probabilistic demand model through the machine learning algorithm, wherein the probabilistic forecast comprises a plurality of demand values each associated with a probability;
        apply an objective function to each of the plurality of demand values in the probabilistic forecast to determine an objective value for each of the plurality of demand values;
        determine a target supply value based on a select demand value with a highest objective value among the plurality of demand values;
        determine a production plan based on the target supply value and a carryover value retrieved from the store data database;
        provide, via the communication device, a production management user interface to a user device associated with the store location, the production management user interface comprises a display of an identifier of the perishable product and the production plan associated with the perishable product;
        receive feedback on the production plan;
        further train the probabilistic demand model based on the feedback using the machine learning algorithm; and
        determine a future production plan based on subsequent probabilistic forecast determined based on the probabilistic demand model of the machine learning algorithm updated based on the feedback on the production plan;
        wherein the objective value for a demand value is determined based on using the demand value as a supply value and calculating costs of overproduction or underproduction at the plurality of demand values of the probabilistic forecast; and
        wherein the objective value of the demand value is further determined based on weighting costs of overproduction or underproduction at each of the plurality of demand values based on their associated probability.

2. The system of claim 1, wherein the store data database stores past sales, past production, past throws, item attributes, item pricing, item production cost, store attributes, promotions, weather, holiday, and store demographic.

3. The system of claim 1, wherein the store data database comprises user entered feedback data or supplemental data received via the production management user interface from the plurality of in-store devices.

4. The system of claim 1, wherein the training dataset is derived from a larger data set based on data anomaly removal and automated time series diagnostics.

5. The system of claim 1, wherein the probabilistic demand model is trained based on a supervised machine learning algorithm for forecasting multiple time series using autoregressive recurrent neural network (RNN).

6. The system of claim 1, wherein the probabilistic forecast is determined based on:
selecting samples from the probabilistic demand model; and
calibrating the probabilistic demand model by scaling samples based on additional machine learning models.

7. The system of claim 1, wherein the production management user interface further comprises a manual adjustment option that allows a user to input an actual production value, and wherein the actual production value and an actual in-store sales are stored in the store data database and used as feedback to further train the probabilistic demand model for future forecasts.

8. The system of claim 1, wherein the control circuit is further configured to:
determine a minimum presentation value based on a difference between the target supply value and an expected demand of the probabilistic demand model; and
provide the minimum presentation value for display via the production management user interface.

9. A method for in-store production management comprising:
selecting, with a control circuit, a training dataset from a store data database;
training a probabilistic demand model using the training dataset based on a machine learning algorithm;
determining, with the control circuit, a probabilistic forecast of a demand for a perishable product at a store location on a date based on the probabilistic demand model through the machine learning algorithm, wherein the probabilistic forecast comprises a plurality of demand values each associated with a probability value;
applying, with the control circuit, an objective function to each of the plurality of demand values in the probabilistic forecast to determine an objective value for each of the plurality of demand values;
determining, with the control circuit, a target supply value based on a select demand value with a highest objective value among the plurality of demand values;
determining a production plan based on the target supply value and a carryover value retrieved from the store data database;
providing, via a communication device configured to communicate with a plurality of in-store devices, a production management user interface to a user device associated with the store location, the production management user interface comprises a display of an identifier of the perishable product and the production plan associated the perishable product;
receiving feedback on the production plan;
further training the probabilistic demand model based on the feedback using the machine learning algorithm; and
determining a future production plan based on subsequent probabilistic forecast determined based on the probabilistic demand model of the machine learning algorithm updated based on the feedback on the production plan;
wherein the objective value for a demand value is determined based on using the demand value as a supply value and calculating costs of overproduction or underproduction at the plurality of demand values of the probabilistic forecast; and
wherein the objective value of the demand value is further determined based on weighting costs of overproduction or underproduction at each of the plurality of demand values based on their associated probability.

10. The method of claim 9, wherein the store data database stores past sales, past production, past throws, item attributes, item pricing, item production cost, store attributes, promotions, weather, holiday, and store demographic.

11. The method of claim 9, wherein the store data database comprises user entered feedback data or supplemental data received via the production management user interface from the plurality of in-store devices.

12. The method of claim 9, wherein the training dataset is derived from a larger data set based on data anomaly removal and automated time series diagnostics.

13. The method of claim 9, wherein the probabilistic demand model is trained based on a supervised machine learning algorithm for forecasting multiple time series using autoregressive recurrent neural network (RNN).

14. The method of claim 9, wherein the probabilistic forecast is determined based on:
selecting samples from the probabilistic demand model; and
calibrating the probabilistic demand model by scaling samples based on additional machine learning models.

15. The method of claim 9, wherein the production management user interface further comprises a manual adjustment option that allows a user to input an actual production value, and wherein the actual production value and an actual in-store sales are stored in the store data database and used as feedback to further train the probabilistic demand model for future forecasts.

16. The method of claim 9, further comprising:
determining a minimum presentation value based on a difference between the target supply value and an expected demand of the probabilistic demand model; and
providing the minimum presentation value for display via the production management user interface.

17. An apparatus for in-store production management comprising:
a non-transitory storage medium storing a set of computer readable instructions; and
a control circuit configured to execute the set of computer readable instructions which cause the control circuit to:
select a training dataset from a store data database;
train a probabilistic demand model using the training dataset based on a machine learning algorithm;
determine a probabilistic forecast of a demand for a perishable product at a store location on a date based on the probabilistic demand model through the machine learning algorithm, wherein the probabilistic forecast comprises a plurality of demand values each associated with a probability value;
apply an objective function to each of the plurality of demand values in the probabilistic forecast to determine estimated objective values for each of the plurality of demand values;

determine a target supply value based on a select demand value with a highest objective value among the plurality of demand values;

determine a production plan based on the target supply value and a carryover value retrieved from the store data database;

provide, via a communication device configured to communicate with a plurality of user devices, a production management user interface to a user device associated with the store location, the production management user interface comprises a display of an identifier of the perishable product and the production plan associated the perishable product;

receive feedback on the production plan;

further train the probabilistic demand model based on the feedback using the machine learning algorithm; and determine a future production plan based on subsequent probabilistic forecast determined based on the probabilistic demand model of the machine learning algorithm updated based on the feedback on the production plan;

wherein the objective value for a demand value is determined based on using the demand value as a supply value and calculating costs of overproduction or underproduction at the plurality of demand values of the probabilistic forecast; and wherein the objective value of the demand value is further determined based on weighting costs of overproduction or underproduction at each of the plurality of demand values based on their associated probability.

18. A system for in-store production management comprising:
a communication device configured to communicate with a plurality of in-store devices over a network;
a store data database; and
a control circuit coupled to the communication device and the store data database, the control circuit being configured to:
select a training dataset from the store data database;
train a probabilistic demand model using the training dataset based on a machine learning algorithm;
determine a probabilistic forecast of a demand for a perishable product at a store location on a date based on the probabilistic demand model through the machine learning algorithm, wherein the probabilistic forecast comprises a plurality of demand values each associated with a probability;
apply an objective function to each of the plurality of demand values in the probabilistic forecast to determine an objective value for each of the plurality of demand values;
determine a target supply value based on a select demand value with a highest objective value among the plurality of demand values;
determine a production plan based on the target supply value and a carryover value retrieved from the store data database;
provide, via the communication device, a production management user interface to a user device associated with the store location, the production management user interface comprises a display of an identifier of the perishable product and the production plan associated with the perishable product;
receive feedback on the production plan;
further train the probabilistic demand model based on the feedback using the machine learning algorithm; and
determine a future production plan based on subsequent probabilistic forecast determined based on the probabilistic demand model of the machine learning algorithm updated based on the feedback on the production plan;
wherein the probabilistic forecast is determined based on:
selecting samples from the probabilistic demand model; and
calibrating the probabilistic demand model by scaling samples based on additional machine learning models.

19. A method for in-store production management comprising:
selecting, with a control circuit, a training dataset from a store data database;
training a probabilistic demand model using the training dataset based on a machine learning algorithm;
determining, with the control circuit, a probabilistic forecast of a demand for a perishable product at a store location on a date based on the probabilistic demand model through the machine learning algorithm, wherein the probabilistic forecast comprises a plurality of demand values each associated with a probability value;
applying, with the control circuit, an objective function to each of the plurality of demand values in the probabilistic forecast to determine an objective value for each of the plurality of demand values;
determining, with the control circuit, a target supply value based on a select demand value with a highest objective value among the plurality of demand values;
determining a production plan based on the target supply value and a carryover value retrieved from the store data database;
providing, via a communication device configured to communicate with a plurality of in-store devices, a production management user interface to a user device associated with the store location, the production management user interface comprises a display of an identifier of the perishable product and the production plan associated with the perishable product;
receiving feedback on the production plan; and
further training the probabilistic demand model based on the feedback using the machine learning algorithm;
wherein the probabilistic forecast is determined based on:
selecting samples from the probabilistic demand model; and
calibrating the probabilistic demand model by scaling samples based on additional machine learning models.

20. An apparatus for in-store production management comprising:
a non-transitory storage medium storing a set of computer readable instructions; and
a control circuit configured to execute the set of computer readable instructions which cause to the control circuit to:
select a training dataset from a store data database;
train a probabilistic demand model using the training dataset based on a machine learning algorithm;
determine a probabilistic forecast of a demand for a perishable product at a store location on a date based on the probabilistic demand model through the machine learning algorithm, wherein the probabilistic forecast comprises a plurality of demand values each associated with a probability value;

apply an objective function to each of the plurality of demand values in the probabilistic forecast to determine estimated objective values for each of the plurality of demand values;

determine a target supply value based on a select demand value with a highest objective value among the plurality of demand values;

determine a production plan based on the target supply value and a carryover value retrieved from the store data database;

provide, via a communication device configured to communicate with a plurality of user devices, a production management user interface to a user device associated with the store location, the production management user interface comprises a display of an identifier of the perishable product and the production plan associated the perishable product;

receive feedback on the production plan;

further train the probabilistic demand model based on the feedback using the machine learning algorithm; and determine a future production plan based on subsequent probabilistic forecast determined based on the probabilistic demand model of the machine learning algorithm updated based on the feedback on the production plan;

wherein the probabilistic forecast is determined based on:
  selecting samples from the probabilistic demand model; and
  calibrating the probabilistic demand model by scaling samples based on additional machine learning models.

* * * * *